United States Patent
Greggain et al.

[11] Patent Number: 6,166,773
[45] Date of Patent: Dec. 26, 2000

[54] METHOD AND APPARATUS FOR DE-INTERLACING VIDEO FIELDS TO PROGRESSIVE SCAN VIDEO FRAMES

[75] Inventors: Lance Greggain, Woodbridge; James Goel, Ajax, both of Canada

[73] Assignee: Genesis Microchip Inc., Ontario, Canada

[21] Appl. No.: 08/911,059

[22] Filed: Aug. 14, 1997

Related U.S. Application Data

[63] Continuation of application No. 08/555,288, Nov. 8, 1995, abandoned.

[51] Int. Cl.$^7$ ................................................. H04N 7/01
[52] U.S. Cl. ................................................. 348/448; 348/581
[58] Field of Search ................................. 348/448, 458, 348/452, 459, 1, 44, 581, 714

[56] References Cited

U.S. PATENT DOCUMENTS

| | | | |
|---|---|---|---|
| 4,698,674 | 10/1987 | Bloom . | |
| 4,872,054 | 10/1989 | Gray et al. | 348/441 |
| 4,937,667 | 6/1990 | Choquet et al. | 348/448 |
| 4,947,251 | 8/1990 | Hentschel | 348/452 |
| 5,070,403 | 12/1991 | Wilkinson | 348/413 |
| 5,134,480 | 7/1992 | Wang et al. | 348/452 X |
| 5,289,305 | 2/1994 | Lake, Jr. | 348/441 X |
| 5,291,280 | 3/1994 | Faroudja et al. | 348/416 |
| 5,305,104 | 4/1994 | Jensen et al. | 348/441 X |
| 5,349,385 | 9/1994 | Glenn . | |
| 5,473,382 | 12/1995 | Nohmi et al. | 348/448 |
| 5,532,750 | 7/1996 | De Haan et al. | 348/452 |
| 5,532,751 | 7/1996 | Lui | 348/452 |
| 5,559,905 | 9/1996 | Greggain et al. | 382/298 |
| 5,579,054 | 11/1996 | Sezan et al. | 348/452 |
| 5,610,661 | 3/1997 | Bhatt | 348/446 |
| 5,619,272 | 4/1997 | Salmon et al. | 348/452 |

FOREIGN PATENT DOCUMENTS

| | | |
|---|---|---|
| 0266079 A2 | 5/1988 | European Pat. Off. . |
| 2151431A | 7/1985 | United Kingdom . |
| 2184628A | 6/1987 | United Kingdom . |
| 2197152A | 5/1988 | United Kingdom . |
| WO 95/08814 | 3/1995 | WIPO . |

OTHER PUBLICATIONS

John Watkinson, "The Art of Digital Video", Second Edition, 1990, pp. 180–185.

Search Report for International Application No. PCT/CA 96/00699.

Patent Abstracts of Japan, vol. 18, No. 674 (P–1846), Dec. 19, 1994 & JP,A,06 266319 (Hitachi), Sep. 22, 1994.

*Primary Examiner*—Victor R. Kostak
*Attorney, Agent, or Firm*—Staas & Halsey LLP

[57] ABSTRACT

A method and apparatus are provided for converting interlaced video fields of arbitrary size to progressive scan format video frames of arbitrary size. The method and apparatus of the invention provide consistent conversion quality even while output video dimensions are scaled in real-time. According to a first aspect of the invention the space between output lines is calculated with respect to the input fields. According to a second aspect, the output line spacing information is used to calculate the final line positions in a progressive scan output frame.

4 Claims, 10 Drawing Sheets

METHOD AND APPARATUS FOR DE-INTERLACING VIDEO FIELDS TO PROGRESSIVE SCAN VIDEO FRAMES

This application is a continuation of application Ser. No. 08/555,288, filed Nov. 8, 1995, now abandoned.

BACKGROUND OF THE INVENTION

1. Field of the Invention

This invention relates in general to video signal de-interlacing and interpolation. More particularly, the invention relates to a method and apparatus for properly interpolating and spatially positioning video lines from an arbitrarily sized video field to create an arbitrarily resized progressive scan frame.

2. Description of the Prior Art

Current state-of-the-art de-interlacing involves converting an interlaced scanned video signal into a progressive scan (sometimes referred to as sequentially scanned) video signal with exactly double or quadruple the number of output lines. The output size restriction makes it very difficult and expensive to de-interlace video fields for use in an application that requires an arbitrarily sized output progressive scan video window. The original video signal is composed of interlaced scanned odd and even fields. These fields are mapped into progressive scan frames through a process of spatial interpolation and positioning that produces exactly double or quadruple the number of input lines per field.

De-interlacing has many applications including slow motion playback, computer video-in-a-window displays and large screen projection television systems to name but a few. All of these applications require the high quality and performance provided by the generation of progressive scan frames using a de-interlacing process.

Producing high quality de-interlaced video signals is difficult. An object in one video field may be in a different spatial position in the next field which makes it very difficult to properly combined the fields into a single progressive scan frame. In such an application, advanced and expensive methods of temporal and vertical interpolation are required to give satisfactory results. One common prior art method of interpolation uses motion detector circuitry to identify areas of a video field which change over time. These changing areas are interpolated differently from static regions to ensure a high quality image.

The complexity and expense of motion detector circuitry and advanced interpolation circuitry restricts the flexibility and affordability of such prior art de-interlacing systems. These systems have been highly optimized to produce either double or quadruple the number of input lines per field, as discussed above.

Examples of well known prior art de-interlacing systems are described in the following publications and patents:
Publications
Watkinson, John, "The Art of DIGITAL VIDEO—2nd Edition", Focal Press 1994, pp. 180–185.
U.S. Patent Documents
    U.S. Pat. No. 5,291,280 March 1994 Faroudja; Yves C.
    U.S. Pat. No. 5,070,403 December 1994 Wilkinson, Basingstoke

SUMMARY OF THE INVENTION

A general aspect of an object of the present invention is to provide a method and apparatus for creating arbitrarily sized output progressive scan frames of video from arbitrarily sized input interlaced video fields in a manner which overcomes the limitations and drawbacks of the prior art.

The method and apparatus of the present invention de-interlaces video by properly interpolating and spatially positioning each input field line at the correct output progressive scan line position based on the relative size of the input and output video frames. The process of the invention is broken down into two steps. The first step involves calculating the space between output progressive scan lines and then using this information to determine the correct spatial position of these lines. Once the position of the output lines is calculated, an image resizing engine is used to map the input lines to the appropriate output spatial position and store these lines in an external frame buffer.

This two-step process continuously calculates output line positions to provide proper de-interlacing for dynamically resized video signals.

DETAILED DESCRIPTION OF THE PREFERRED EMBODIMENT

As discussed above, video de-interlacing is achieved in accordance with the present invention by continuously calculating the spatial position of the output lines and then mapping interlaced input fields to progressive scan output frames.

Figure 1:
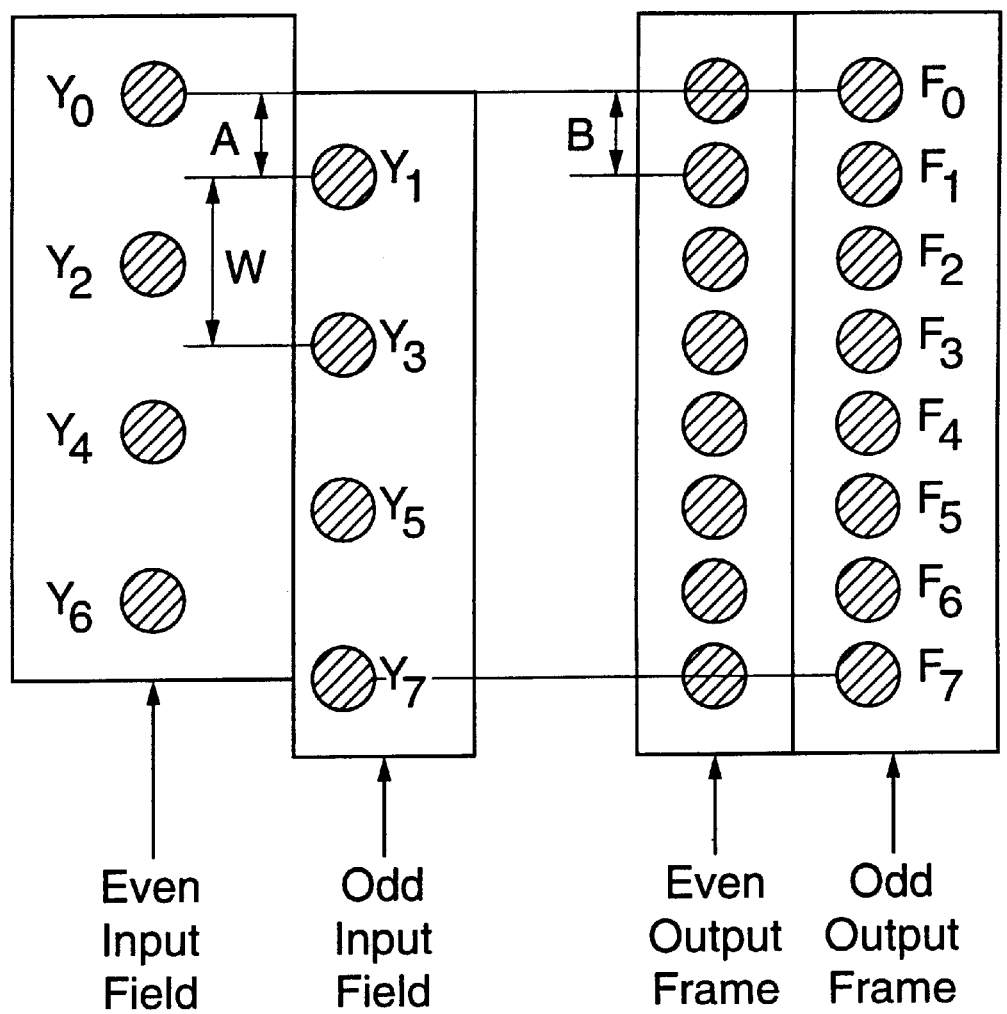
FIG. 1 is a schematic representation of a plurality of target lines derived from a plurality of source lines in magnification mode, wherein the number of lines in the input fields is increased to map to the number of the lines in the output frames.
Figure 2:
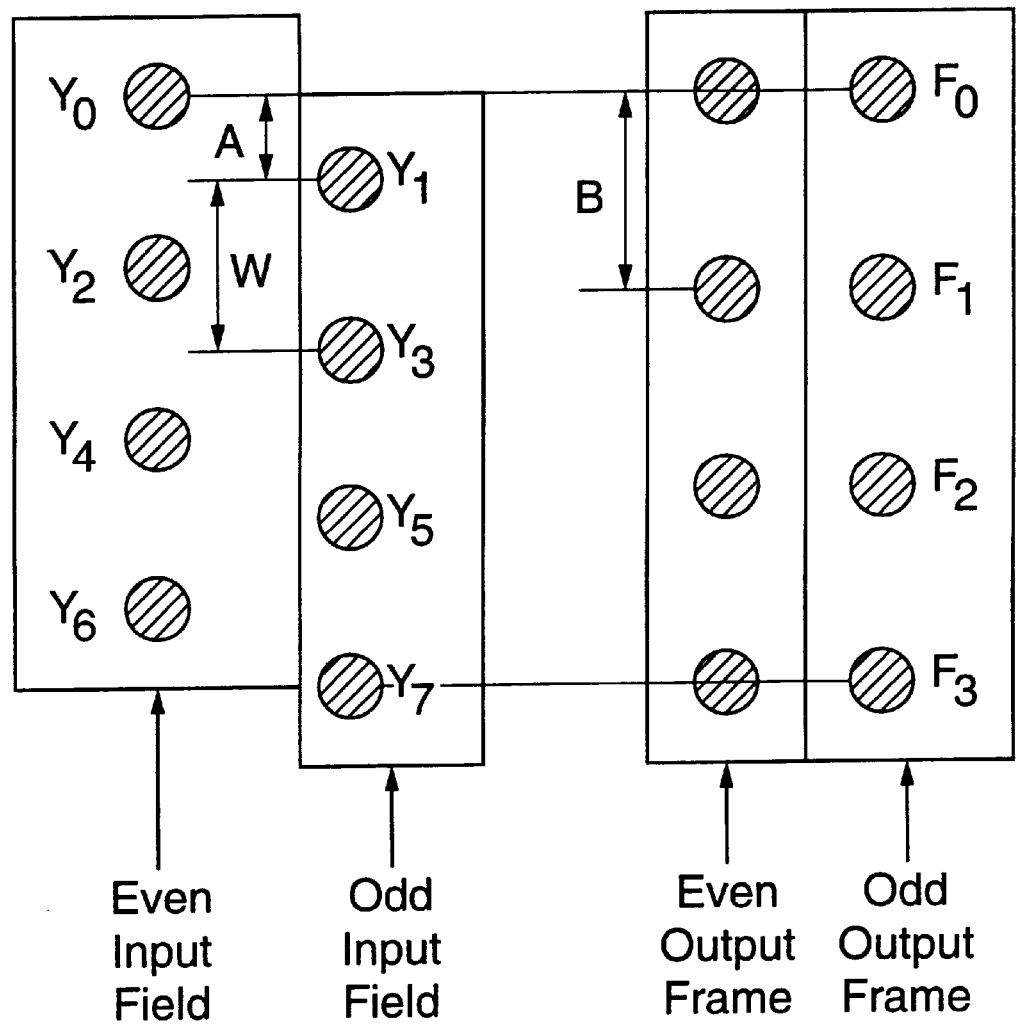
FIG. 2 is a schematic representation of a plurality of target lines derived from a plurality of source lines in bypass mode, wherein the number of lines in the input fields is equal to the number of lines in the output frames.
Figure 3:
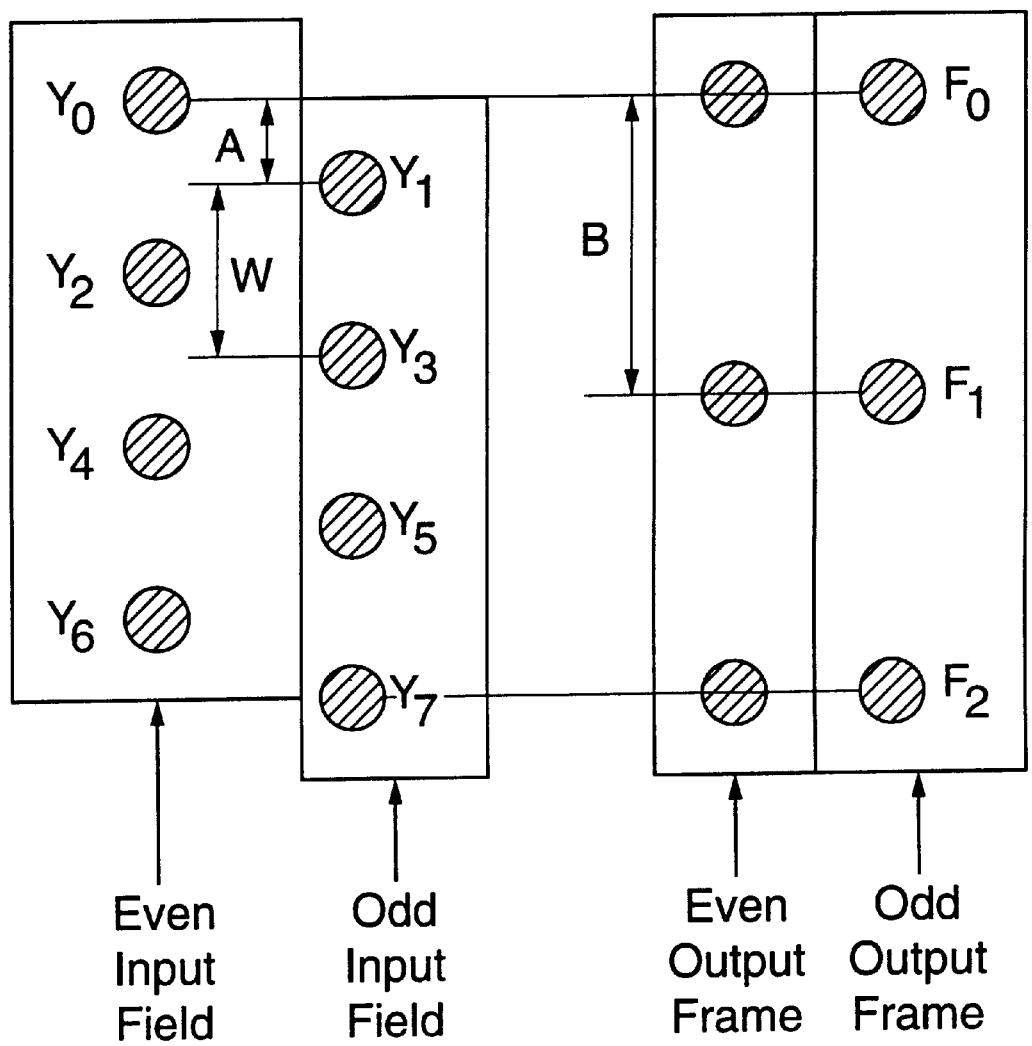
FIG. 3 is a schematic representation of target lines derived from a plurality of source lines in reduction mode, wherein the number of lines in the input fields is decreased to map to the number of lines in the output frames.

FIGS. 1, 2 and 3 each show two input fields (not to scale) which are referred to as the Even Input Field (lines Y0, Y2, Y4, Y6) and the Odd Input Field (lines Y1, Y3, Y5, Y7), and two output frames referred to as the Even Output Frame and the Odd Output Frame. All even input fields are mapped to even output frames and the odd input fields are mapped to the odd output frames. The variables in each of these figures is explained in Table A, below:

TABLE A

| Variable Name | Description |
| --- | --- |
| A | Space between input interlaced video lines |
| W | Space between lines in the even or odd input fields |
| B | Space between lines in the even or odd output frames |
| S | The number of lines in each input field |
| T | The number of lines in each output frame |

According to the present invention, the following relationship is implemented for determining the space between output lines with respect to the interlaced input lines:

$$TarInc=B=(2*S-1)/(2*(T-1)) \quad (1\text{-}1)$$

The actual spatial position of the output lines depends on whether the input field is even or odd. An even input field has lines positioned in the even line spaces and an odd input field has lines positioned in the odd line spaces. The following relationship is implemented for determining the spatial position of the output lines:

$$P_j=P_{j-1}+TarInc, j=1 \ldots T-1 \quad (1\text{-}2)$$

where $P_{j=0}=0$ for Even Input Fields $P_{j=0}=0.5$ for Odd Input Fields

Magnification Mode

FIG. 1 shows a single input interlaced video frame containing a total of 8 lines numbered 0 to 7. In actual fact, standard interlaced video frames contain even and odd fields each having 240 active lines, for a total of 480 lines per frame. A reduced number of lines are depicted for ease of illustration. The even lines Y1, Y2, Y4 and Y6 are stored in the even field and the odd lines Y1, Y3, Y5 and Y7 are stored in the odd field.

Each de-interlaced output frame contains a total of 8 lines numbered 0 through 7. To map each input field (4 lines) to each output frame (8 lines) requires a magnification of 2 times. It is important to note that only the first line of the even field (Y0) maps to the first line of the even output frame (F0) and the last line of the odd field (Y7) maps to the last line of the odd output frame (F7). The remaining input lines are mapped to a fractional position with respect to the output frames.

Figure 4:
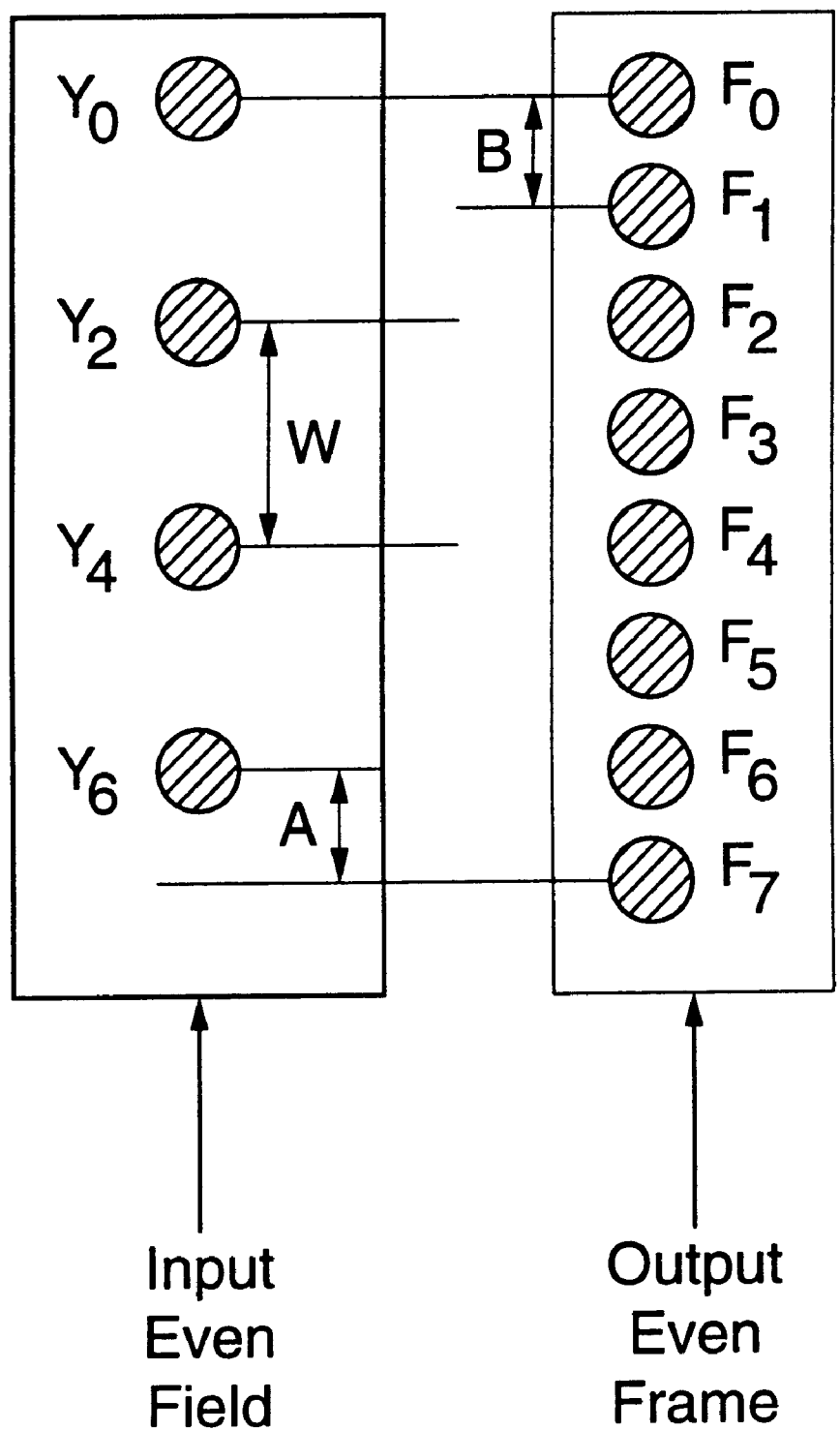
FIGS. 4 and 5 are schematic representations showing details of even field resizing and odd field resizing, respectively, for the de-interlacing system of the preferred embodiment.
Figure 5:
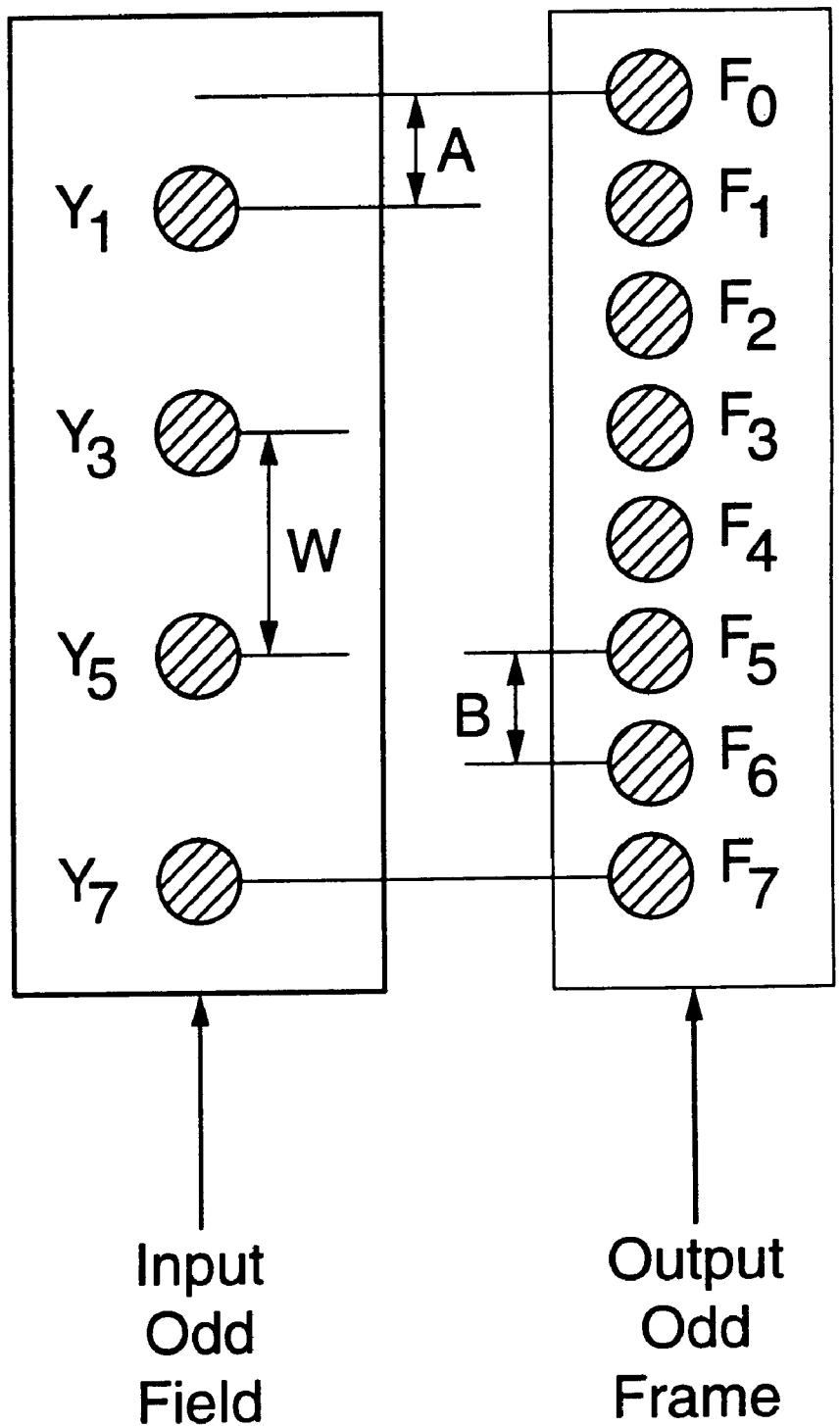

The method and apparatus of the present invention correctly calculates the output line position depending on the user specified resize factor, as shown in greater detail with reference to FIGS. 4 and 5.

Since all of the even and odd field lines are equally spaced (e.g. A=1; S=4 and T=8 in the example of FIGS. 4 and 5) by mapping the input even field to the output even frame, then $$A*(2*S-1)=B*(T-1) \quad (2\text{-}1),$$

and by positioning the input odd field lines between the input even field lines, then $$A=\tfrac{1}{2}*W \quad (2\text{-}2).$$

Substituting (2-2) into (2-1) and solving for B:

$$B = ((2*S-1)*W)/(2*(T-1)) \quad (2\text{-}3)$$
$$= 0.5W$$

The variable B is now equal to the space between output lines with respect to the interlaced input lines.

According to the next step in the method of the present invention, the proper spatial location of each output line is determined using 1-2, resulting in the spatial locations set forth in Tables B and C, for the even output frame (FIG. 4) and the odd output frame (FIG. 5), respectively.

TABLE B

| Output Line Number | Spatial Location (1-2) |
| --- | --- |
| F0 | $P_{j-0} = 0$ |
| F1 | $P_{j-1} = 0.5W$ |
| F2 | $P_{j-2} = 1.0W$ |
| F3 | $P_{j-3} = 1.5W$ |
| F4 | $P_{j-4} = 2.0W$ |
| F5 | $P_{j-5} = 2.5W$ |
| F6 | $P_{j-6} = 3.0W$ |
| F7 | $P_{j-7} = 3.5W$ |

TABLE C

| Output Line Number | Spatial Location (1-2) |
| --- | --- |
| F0 | $P_{j-0} = -0.5W$ |
| F1 | $P_{j-1} = 0W$ |
| F2 | $P_{j-2} = 0.5W$ |
| F3 | $P_{j-3} = 1.0W$ |
| F4 | $P_{j-4} = 1.5W$ |
| F5 | $P_{j-5} = 2.0W$ |
| F6 | $P_{j-6} = 2.5W$ |
| F7 | $P_{j-7} = 3.0W$ |

The methodology discussed above with respect to magnification mode, can be used for both bypass and reduction modes.

Bypass Mode

Since all of the even and odd field lines are equally spaced (e.g. A=1; S=4 and T=4 from FIG. 2), by mapping the input even field to the output even frame, then $$A*(2*S-1)=B*(T-1) \quad (2\text{-}1),$$

and by positioning the input odd field lines between the input even field lines, then $$A=\tfrac{1}{2}*W \quad (2\text{-}2)$$

substituting (2-2) into (2-1) and solving for B:

$$B = ((2*S-1)*W/(2*(T-1))$$
$$= 7/6W$$

According to the next step in the method of the present invention, the proper spatial location of each output line is determined using 1-2, resulting in the spatial locations set forth in Tables D and E for the even output frame and the odd output frame, respectively.

TABLE D

| Output Line Number | Spatial Location (1-2) |
|---|---|
| F0 | $P_{j=0} = 0$ |
| F1 | $P_{j=0} = 1.166(7/6)W$ |
| F2 | $P_{j-2} = 2.33(14/6)W$ |
| F3 | $P_{j-3} = 3.5(21/6)W$ |

TABLE E

| Output Line Number | Spatial Location (1-2) |
|---|---|
| F0 | $P_{j=0} = -0.5W$ |
| F1 | $P_{j-1} = 0.667(7/6 - 0.5)W$ |
| F2 | $P_{j-2} = 1.833(14/6 - 0.5)W$ |
| F3 | $P_{j-3} = 3.0(21/6 - 0.5)W$ |

Reduction Mode

Since all of the even and odd field lines are equally spaced (e.g. A=1; S=4 and T=3 from FIG. 3), by mapping the input even field to the output even frame, then $$A*(2*S-1)=B*(T-1) \quad (2-1),$$

and by positioning the input odd field lines between the input even field lines, then $$A=\frac{1}{2}*W \quad (2-2)$$

Substituting 2-2 into (2-1) and solving for B $$B = ((2*S-1)*W)/(2*(t-1)) \quad (2-3)$$

$$= 7/4W$$

According to the next step in the method of the present invention, the proper spatial location of each output line is determined using 1-2, resulting in the spatial locations set forth in Tables F and G for the even output frame and the add output frame, respectively.

TABLE F

| Output Line Number | Spatial Location (1-2) |
|---|---|
| F0 | $P_{j=0} = 0$ |
| F1 | $P_{j-1} = 1.75(7/4)W$ |
| F2 | $P_{j-2} = 3.5(14/4)W$ |

TABLE G

| Output Line Number | Spatial Location (Equation 1-2) |
|---|---|
| F0 | $P_{j=0} = -0.5$ |
| F1 | $P_{j-1} = 1.25(7/4 - 0.5)W$ |
| F2 | $P_{j-2} = 3.0(14/4 - 0.5)W$ |

Figure 6:
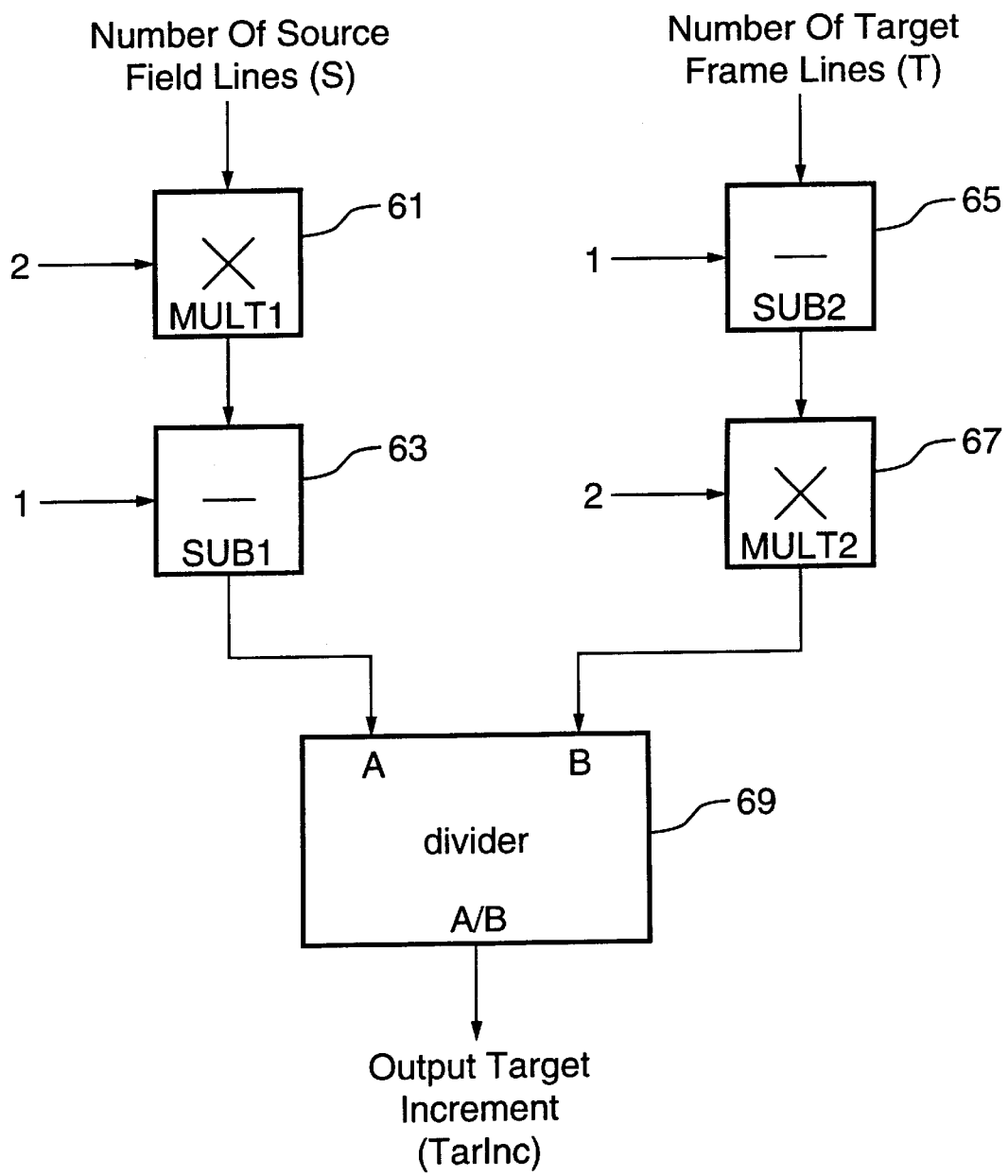
FIG. 6 is a block diagram showing the functional components of a first aspect of the de-interlacing system according to the preferred embodiment for calculating a Target Increment (TarInc) value.

FIG. 6 depicts a hardware embodiment for executing the process set forth in 1-1. The number of source field lines (S) is multiplied by 2 using a first multiplier 61, and then 1 is subtracted from the product using a first subtractor 63. The value 1 is subtracted from the number of target frame lines using a second subtractor 65, and the sum is multiplied by 2 using a second multiplier 67. The output of subtractor 63 is divided by the output of multiplier 67 using a divider 69, to produce the Output Target Increment (TarInc) value.

Figure 7:
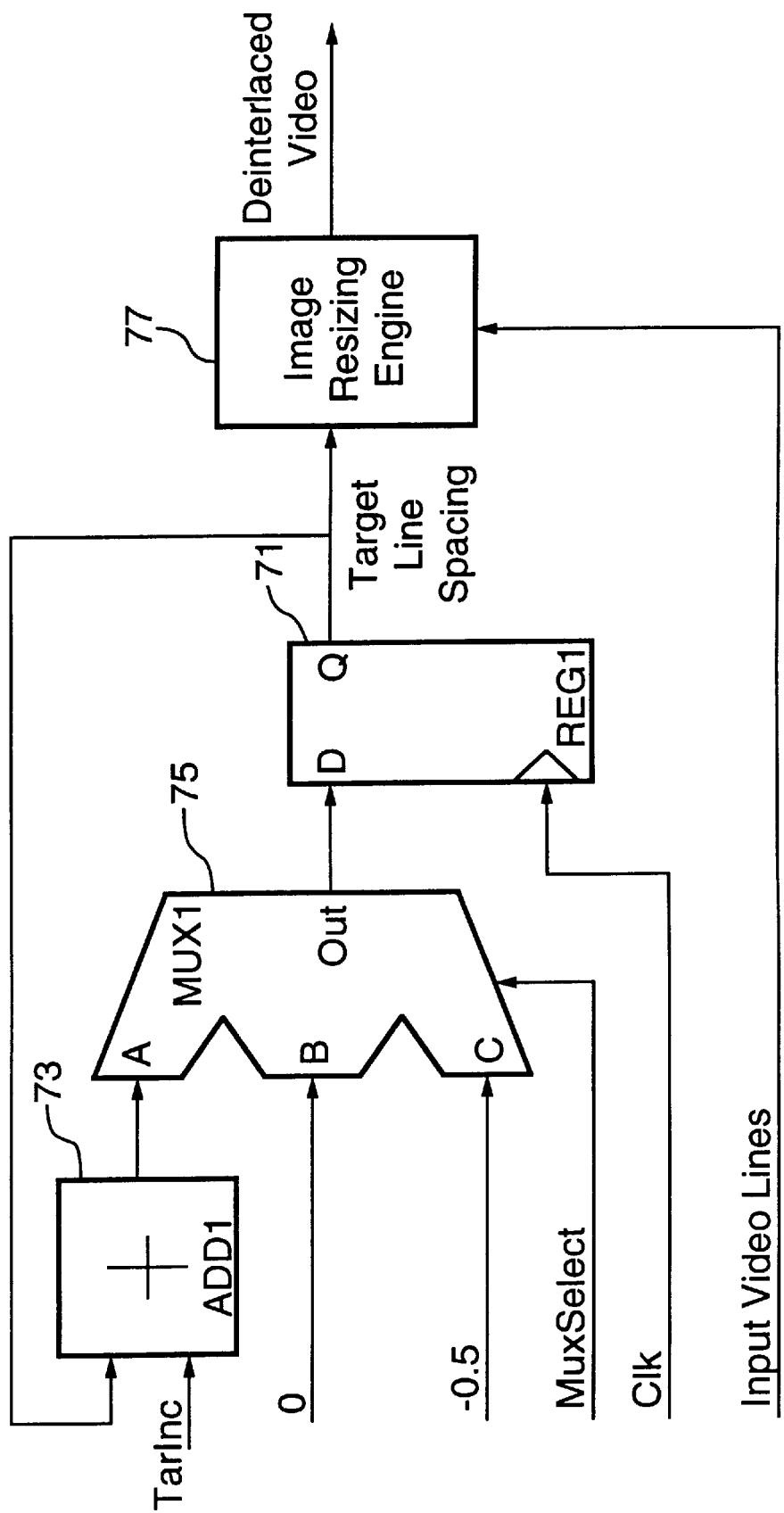
FIG. 7 is a block diagram showing the functional components of a second aspect of the de-interlacing system that uses the TarInc value to generate a correct Target Line Spacing.

FIG. 7 depicts a hardware embodiment for executing the process set forth in 1-2. An accumulator is formed by the combination of register 71 and adder 73 with multiplexer 75 controlling the initial value. As the data from an even field is loaded into image resizing engine 77, the MuxSelect signal ensures that the value 0 is multiplexed into register 71 to initialize the accumulator to zero. As each new input line is loaded into the image resizing engine 77, the value of TarInc is accumulated to produce the target line spacing value required for an even output frame. When data from an odd field is loaded into the image resizing engine 77, the MuxSelect signal ensures that the value −0.5 is multiplexed into register 71 to initialize the accumulator. This ensures that all target line spacing values produced for an output frame are properly positioned. The Clk signal is used to synchronize all data movement in accordance with standard digital system design.

Figure 8A:
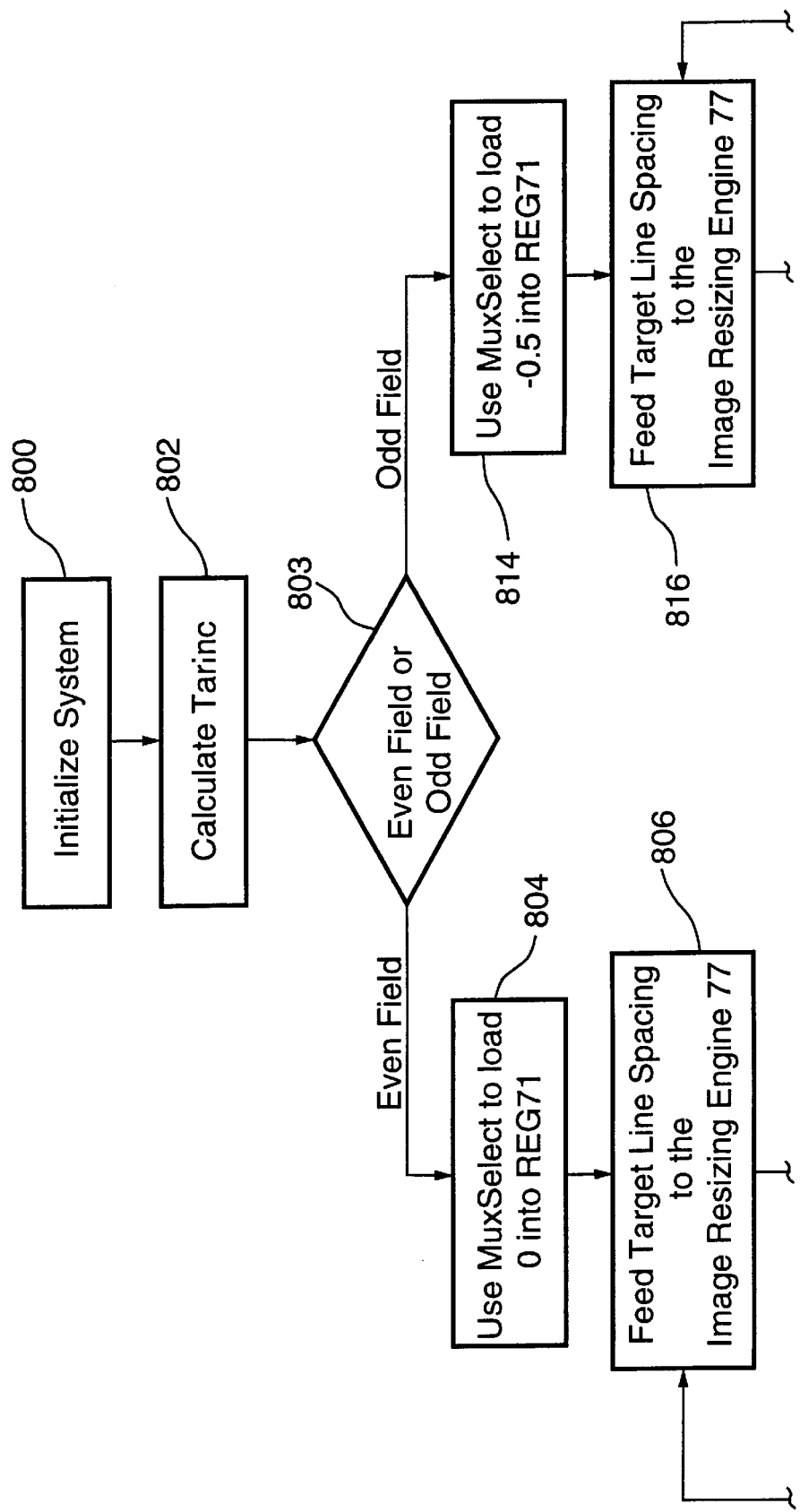
FIG. 8 is a flow chart showing operation of the de-interlacing system shown in FIGS. 6 and 7.
Figure 8B:
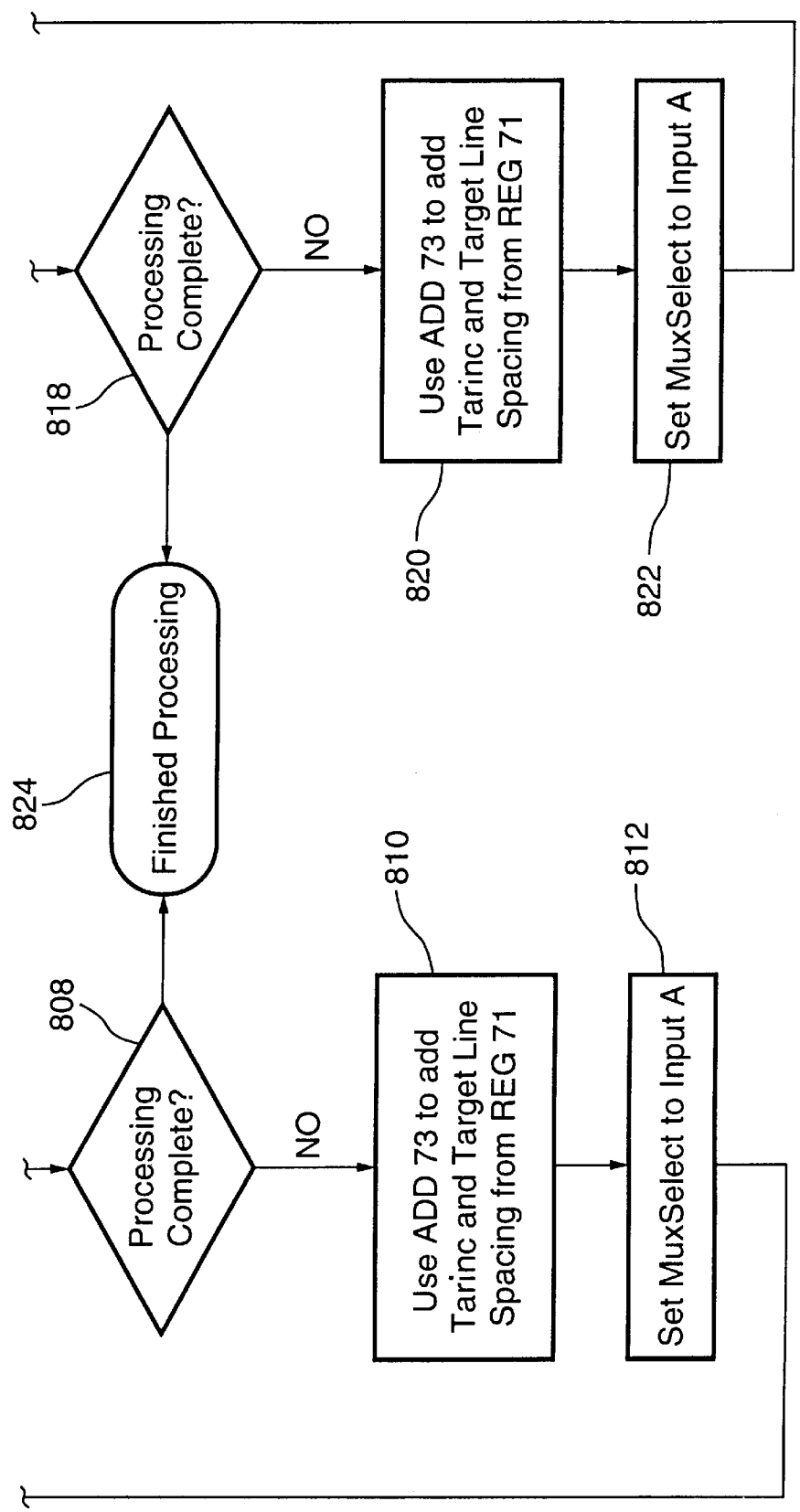

FIG. 8 depicts a flow chart illustrating the control system for the hardware embodiment of FIGS. 6 and 7. After the system is initialized (step 80), a TarInc value is calculated (step 82), as discussed in greater detail above. If the apparatus is processing an even field (step 803), the MuxSelect signal loads a 0 value into register 71 (step 804) and then loads the Target Line Spacing to the Image Resizing Engine 77 (step 806). If more lines must be processed (i.e. a NO decision at step 808), Adder 73 adds TarInc and Target Line Spacing from register 71 (step 810). MuxSelect now selects input A of multiplexer 75 (step 812) and the new Target Line Spacing is fed to the Image Resizing Engine (step 808). The odd field is processed the same way with respect to steps 803 and 814–822, except that an initial starting value of −0.5 is loaded in register 71 (step 814).

After both the even and odd fields have been processed, (step 824), then the system waits to process the next pair of input video fields relative to the next calculated Target-Line spacing.

Output frame lines must be stored at different locations in an external frame buffer. FIG. 8 shows storage of video lines from the output even frame starting at the top of the frame buffer. Lines from the output odd frame are stored in such a way that the last line is at the bottom of the frame buffer. These different storage requirements greatly simplify the top and bottom boundary conditions encountered while spatially positioning the output.

Figure 9:
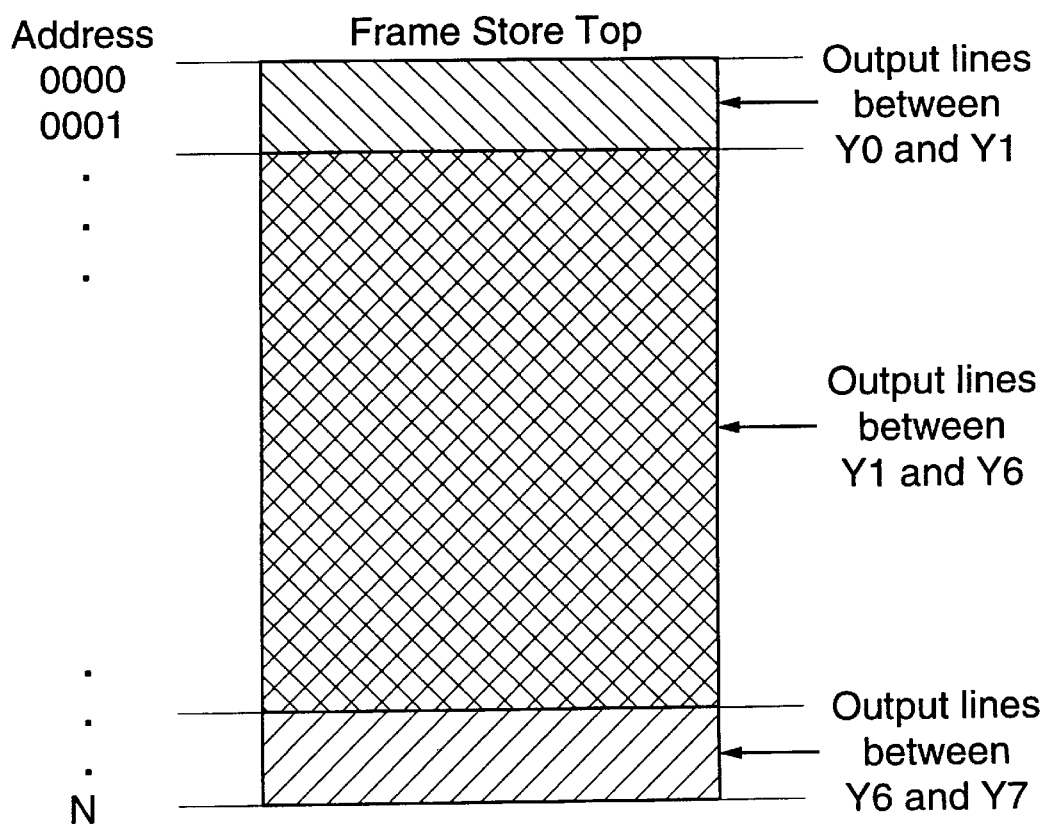
FIG. 9 is a memory map diagram showing the placement of the output lines in an external output frame store, according to the preferred embodiment.

All of the hardware components depicted in FIGS. 6 and 7, and the frame buffer whose operation is discussed in FIG. 9, are of well known design. The image resizing engine is preferably as set forth in U.S. patent application Ser. No. 125,530 filed Sep. 22, 1993, the contents of which are incorporated herein by reference.

According to an alternative embodiment of the present invention, the steps of calculating the output target increment and output line spacing as set forth in the hardware embodiment of FIGS. 6 and 7, with reference to FIG. 8, may be implemented by a computer implementing appropriate software such as set forth in Appendix A to the present disclosure.

Other embodiments and variations of the invention are possible. For example, rather than having an integer number of lines per field or per frame, the apparatus of the present invention will operate equally well where a fractional number of lines are provided per field or per frame. All such embodiments are believed to be within sphere and scope as set forth in the claims appended hereto.

```
//
// Even Field De-Interlacing
//
GSZ_INT CGSZBitmap::DeIntEvn(GSZ_INT GenesisType)
//
// BEGIN DeIntEvn
//     GenesisType -- Type of Genesis resizing algorithm to perform
//
{
    GSZ_INT        CurrentLine;
    GSZ_INT        NevSourceLine;
    GSZ_INT        CurSourceLine;
    GSZ_INT        XFilter;
    GSZ_INT        YFilter;
    GSZ_INDEX      TincX;
    GSZ_INDEX      TincY;
    GSZ_INDEX      TincYAccum;
    GSZ_INT        KernalY;
    GSZ_INT        KernslYSize;
    CGSZLine       InputRav;
    CGSZRGBLine    Input;
    CGSZRGBLine    PrevInput;
    CGSZRGBLine    UpsampleX;
    CGSZRGBLine    UpsampleY;
    CGSZRGBLine    Filtered1;
    CGSZRGBLine    Filtered2;
    CGSZLine       OutputRaw;
    CGSZRGBLine    Output;
    XFilter = CalcFilter(iSourceX, iTargetX);
    YFilter = CalcFilter(iSourceY, iTargetY);
    if ((XFilter < 0) || (YFilter < 0) || (XFilter >= MAX_FILTER) || (YFilter >= MAX_FILTER))
        return( FILTER_TOO_LARGE );
    assert(XFilter >= 0);
    assert(XFilter < MAX_FILTER);
    assert(YFilter >= 0);
    assert(YFilter < MAX_FILTER);
    //
    // Initialize the value of TincYAccum to 0 indicates that the
    // first filtered output line lies directly under the first
    // input line.
    TincyAccum = 0;
    // Calculate Horizontal and Vertical Tinc
    // These values are all shifted Left to ensure that all calculations are
    // performed in integer arithmetic and then shifted back after the
    // division.
    //
    // Calculate Horizontal TarInc using Even Field De-Interlacing Equation
    //
    TincX = ((((GSZ_INDEX) (iSourceX - 1)) << INDEX_PRECISION) / (iTargetX - 1)) >> XFilter;
    //
    // Calculate Vertical TarInc using Even Field De-Interlacing Equation
    //
    TincY = ((((GSZ_INDEX) (2eiSourceY - 1)) << INDEX_PRECISION) / (2*(iTargetY - 1))) >> YFilter;
    assert (TincX <= INDEX_PRECISION_MASK);
    assert(TincY <= INDEX_PRECISION_MASK);
    //
    // Calculate the size of the required FIR filter
    //
    KernalYSize = 1 << YFilter;
    //
    // Create memory space for the required video lines
    //
    InputRaw.Allocate(iSourceX);
    OutputRaw.Allocate(iTargetX);
    Input.Allocate(iSourceX);
    Output.Allocate(iTargetX);
    PrevInput.Allocate(iSourceX);
    UPSampleY.Allocate(iSourceX);
    UPSampleX.Allocate(((iTargetX - 1) << XFilter) + 1);
    Filtered1.Allocate(iSourceX);
    Filtered2.Allocate(isourceX);
    //
    // Initialize the Source control flags
    // When NewSourceLine equals CurrentSourceLine, it means that the Integer
    // portion of the TincAccumulator has "crossed" an input line boundary. Once
    // this happens, a new input line must be read from the input bitmap.
    // NOTE: The first time through the algorithm, NewSourceLine is articifically
    // set to -1 to force the initial reading of the second source line.
    //
```

-continued

```
NewSourceLine = -1;
CurSourceLine = 0;
//
// Read the first input line and convert it to RGB format
// The raw input line has the pixel bytes ordered RGBRGBRGB. . .
// Our algorithm requires three separate streams of RRR. . ., GGGG. . ., and BBBB. . .
// processed concurrently. Therefore, the routine ReadLine reads a raw line
// and then passes this information to ToRGBLine for separation into R, G and
// B streams.
//
InputRaw.ReadLine(&Source, 0);
InputRaw.ToRGBLine(Input);
//
// Perform the center tap multiply on the first input line
//
Filtered1.FilterY(iCoeff[GenesisType][YFilter] [0], Input);
//
// LOOP through the rest of the FIR kernel coefficients for the
//     first filtered output line,
//
for (KernalY = 1; KernalY <= KernalYSize; KernalY++)
    //
    // Perform the appropriate multiply-accumulate for each FIR
    // coefficient
    Filtered1.FilterYAdd(iCoeff [GenesisType] [YFilter] [KernalY], Input);
//
// ENDLOOP: -- FIR kernel coefficients
//
// Start the second filtered line using the cuter most FIR coefficient
//
Filtered2.FilterY(iCoeff[GenesisType] [YFilter] [KernalYSize], Input);
//
// LOOP through all the input lines,
//
for (CurrentLine = 0; CurrentLine < iTargetY; CurrentLine++)
{
    //
    // LOOP through half of the FIR coefficients (excluding the centre tap)
    //
    for (KernalY = 1; KernalY <= KernalYSize; KernalY++)
    {
        // Accumulate the vertical Tinc value
        //
        TincyAccum += TincY;
        //
        // Get the integer Portion of the accumulate Tinc to determine
        // if the value has "crossed" an input line boundary. A crossing
        // occurs when the integer portion of TincAccum changes. In this
        // implementation, the integer portion is the number of the new
        // raw input line.
        //
        NewSourceLine = GetInt(TincYAccum) + 1;
        //
        // IF the integer portion of TincAccum has changed, THEN:
        //
        if (NewSourceLine != CurSourceLine)
        {
            // Swap the current input line with the previous one,
            // and then read in a new input line into the
            // current input. (This erases the old input line)
            //
            PrevInput.SwapLineWith (Input);
            InputRaw.ReadLine (&Source, NewSourceLine);
            InPutRaw.ToRGBLine(Input);
            CurSourceLine = NewSourceLine
        //
        // ENDIF: -- if integer portion of TincAccum
        //
        }
        // Create an upsampled line based on the current input and
        // the previous input.
        // Create the output filtered lines by correctly multiply-accumulating
        // the FIR coefficients.
        //
        UpsampleY.UmsampleY (TincYAccum, PrevInput, Input);
        Filtered1.FilterYAdd(iCoeff[GenesisType] [YFilter] [KernalY], UpsampleY);
        Fiitered2.FilterYAdd(iCoeff[GenesisType] [YFilter] [KernalYSize - KernalY], UpsampleY)
    //
    // ENDLOOP: -- half of the FIR Coefficients
```

-continued

```
            //
            }
            // Output line Filtered1 is now complete. Swap it with the
            // incomplete Filtered2 line and adjust the filter gain.
            // Filtered2 is ready for horizontai processing.
            Filtered2.SwapLineWith (Filtered1);
            Filtered2.FilterYGain();
            //
            // Upsample and filter the vertically complete Filtered2 line
            //
            UpsampleX.UpsampleX(Tincx, Filtered2);
            Output.FilterX(GenesisType, XFilter, UpsampleX);
            //
            // Write the vertically and horizontally complete Filtered2 line
            // back to the output bitmap.
            OutputRaw.FromRGBLine(Output);
            OutputRaw.PutLine(&Target, CurrentLine);
            //
            // Reset the Filtered2 line with the center FIR coefficient
            //
            Filtered2.FilterY(iCoeff[GenesisType] [YFilter] [KernalYSize], UpsampleY);
            //
            // Update the progress status display
            //
            ResizeBreathe(CurrentLine.iTargetY);
        //
        // ENDLOOP: -- through all input line.
        //
        }
        return( ALL_OK );
//
END: -- ResizeGenesis
//
}
//
// Odd Field De-Interlacing
//
GSZ_INT CGSBitmap::DeIntOdd(GSZ_INT GenesisType)
//
// BEGIN OddField De-Interlacing
//       GenesisType -- Type of Genesis resizing algorithm to perform
{
        GSZ_INT        CurrentLine;
        GSZ_INT        NevSourceLine;
        GSZ_INT        CurSourceLine;
        GSZ_INT        XFilter;
        GSZ_INT        YFilter;
        GSZ_INDEX      TincX;
        GSZ_INDEX      TincY;
        GSZ_INDEX      TincYAccum;
        GSZ_INT        KernalY;
        GSZ_INT        KernslYSize;
        CGSZLine       InputRav;
        CGSZRGBLine    Input;
        CGSZRGBLine    PrevInput;
        CGSZRGBLine    UpsampleX;
        CGSZRGBLine    UpsampleY;
        CGSZRGBLine    Filtered1;
        CGSZRGBLine    Filtered2;
        CGSZLine       OutputRaw;
        CGSZRGBLine    Output;
        XFilter = CalcFilter(iSourceX, iTargetX);
        YFilter = CalcFilter(iSourceY, iTargetY);
        if ((XFilter < 0) || (YFilter < 0) || (XFilter >= MAX_FILTER) || (YFilter >= MAX_FILTER))
            return( FILTER_TOO_LARGE );
        assert(XFilter >= 0);
        assert(XFilter < MAX_FILTER);
        assert(YFilter >= 0);
        assert(YFilter < MAX_FILTER);
        //
        // Initializing the value of TincYAccum to -0.5 indicates that the
        // first filtered output line is in the odd field of the input
        // bitmap. This first line is offset by a slight negative amount
        // indicating its 1/2 line negative adjustment for the odd field.
        //
        TincYAccum = -2048;
        //
        // Calculate Horizontal and Vertical Tinc
        // These values are all shifted Left to ensure that all calculations are
```

-continued

```
// performed in integer arithmetic and then shifted hack after the
// division.
//
// Calculate Horizontal TarInc using the odd Field De-Interlacing Equation
//
TincX = (C((GSZ_INDEX) (iSourceX - 1)) << INDEX_PRECISION) / (iTargetX - 1)) >> XFilter;
//
// Calculate Vertical TarInc using the Even Field De-Interlacing Equation
//
TincY = ((((GSZ_INDEX) (2*iSourceY - 1)) << INDEX_PRECISION) / (2*(iTargetY - 1))) >> YFilter;
assert(TincX <= INDEX_PRECISION_MASK);
assert(TincY <= INDEX_PRECISION_MASK);
//
// Calculate the size of the required FIR filter
//
KernalYSize = 1 << YFilter;
//
// Create memory space for the required video lines
//
InputRaw.Allocate(iSourceX);
OutputRaw.Allocate(iTargetX);
Input.Allocate(iSourceX);
Output.Allocate(iTargetX);
PrevInput.Allocate(iSourceX);
UpsampleY.Allocate(iSourceX);
UpsampleX.Allocate(((iTargetX - 1) << XFilter) + 1);
Filtered1.Allocate(iSourceX);
Filtered2.Allocate(iSourceX);
//
// Initialize the Source control flags
// When NewSourceLine equals CurrentSourceLine, it means that the Integer
// portion of the TincAccumulator has "crossed" an input line boundary. Once
// this happens, a new input line must be read from the input bitmap.
// NOTE: The first time through the algarithm, NewSourceLine is articifically
// set to -1 to force the initial reading of the second source line.
//
NewSourceLine = -1;
CurSourceLine = 0;
//
// Read the first input line and convert it to RGB format
// The raw input line has the pixel bytes ordered RGBRGBRGB...
// Our algoritm requires three separate streams of RRR..., GGGG..., and BBBB...
// processed concurrently. Therefore, the routine ReadLine reads a raw line
// and then passes this information to ToRGBLine for separation into R, G and
// B streams.
//
InputRaw.ReadLine(&Source, 0);
InputRaw.ToRGBLine(Input);
//
// Perform the center tap multiply on the first input line
//
Filtered1.FilterY(icoeff[GenesisType] [YFilter] [0], Input);
//
// LOOP through the rest of the FIR kernel coefficients for the
//      first filtered output line.
//
for (KernalY = 1; KernalY <= KernalYSize; KernalY++)
    //
    // Perform the appropriate multiply-accumulate for each FIR
    // coefficient
    //
    Filtered1.FilterYAdd(iCoeff[GenesisType] [YFilter ] [KernalY], Input);
    //
// ENDLOOP: -- FIR kernel coefficients
//
// Start the second filtered line using the outer most FIR coefficient
//
Filtered2.FilterY(iCoeff[GenesisType] [YFilter] [KernalYSize], Input);
//
// LOOP through all the input lines,
//
for (CurrentLine = 0; CurrentLine < iTargetY; CurrentLine++
{
    //
    // LOOP through half of the FIR coefficients (excluding the centre tap)
    //
    for (KernalY = 1; KernalY <= KernalYSize; KernalY++)
    {
    //
```

```
        TincyAccum += TincY;
        //
        // Get the integer Portion of the accumulate Tinc to determine
        // if the value has "crossed" an input line boundary. A crossing
        // occurs when the integer portion of TincAccum changes. In this
        // implementation, the integer portion is the number of the new
        // raw input line.
        //
        NewSourceLine = GetInt(TincYAccum) + 1;
        //
        // IF the integer portion of TincAccum has changed, THEN:
        //
        if (NewSourceLine != CurSourceLine)
        {
           // Swap the current input line with the previous one,
           // and then read in a new input line into the
           // current input. (This erases the old input line)
           //
           PrevInput.SwapLineWith (Input);
           InputRaw.ReadLine (&Source, NewSourceLine);
           InPutRaw.ToRGBLine(Input);
           CurSourceLine = NewSourceLine
        //
        // ENDIF: -- if integer portion of TincAccum
        //
        }
        // Create an upsampled line based on the current input and
        // the previous input.
        // Create the output filtered lines by correctly multiply-accumulating
        // the FIR coefficients.
        //
        UpsampleY.UmsampleY (TincYAccum, PrevInput, Input);
        Filtered1.FilterYAdd(iCoeff[GenesisType] [YFilter] [KernalY], UpsampleY);
        Fiitered2.FilterYAdd(iCoeff[GenesisType] [YFilter] [KernalYSize - KernalY], UpsampleY)
     //
     // ENDLOOP: -- half of the FIR Coefficients
     //
     }
     // Output line Filtered1 is now complete. Swap it with the
     // incomplete Filtered2 line and adjust the filter gain.
     // Filtered2 is ready for horizontai processing.
     Filtered2.SwapLineWith (Filtered1);
     Filtered2.FilterYGain();
     //
     // Upsample and filter the vertically complete Filtered2 line
     //
     UpsampleX.UpsampleX(Tincx, Filtered2);
     Output.FilterX(GenesisType, XFilter, UpsampleX);
     //
     // Write the vertically and horizontally complete Filtered2 line
     // back to the output bitmap.
     OutputRaw.FromRGBLine(Output);
     OutputRaw.PutLine(&Target, CurrentLine);
     //
     // Reset the Filtered2 line with the center FIR coefficient
     //
     Filtered2.FilterY(iCoeff[GenesisType] [YFilter] [KernalYSize], UpsampleY);
     //
     // Update the progress status display
     //
     ResizeBreathe(CurrentLine.iTargetY);
  //
  // ENDLOOP: -- through all input line.
  //
  }
  return( ALL_OK );
//
END: -- ResizeGenesis
//
}
```

What is claimed is:

1. A video de-interlacing system for mapping one of odd or even input video fields each having a predetermined number of lines per field to a single output video frame having a predetermined number of lines per frame, comprising:

a) a target increment calculator for receiving said predetermined number of lines per field and said predetermined number of lines per frame and in response generating a target increment value representing space between respective lines of said output video frame based on space between lines of said input video fields;

b) a target spacing calculator for receiving said target increment value and for successive ones of said lines of said output video frame generating respective target line spacing values associated with said odd or even input video fields; and c) an image resizing engine for receiving successive ones of said lines of said odd or even input video fields and respective target line spacing values and in response generating successive lines of said output video frame, wherein said target spacing calculator introduces a spatial offset between said target line spacing values associated with said odd field and said even field; and wherein said spatial offset is equivalent to one-half of said space between lines of said input video fields.

2. The system of claim 1, wherein said target increment calculator further comprises:

d) a first multiplier for multiplying said number of lines per field by two and in response generating a first product value;

e) a first subtractor for subtracting one from said first product value and in response generating a first difference value;

f) a second subtractor for subtracting one from said number of lines per frame and in response generating a second difference value;

g) a second multiplier for multiplying said second difference value by two and in response generating a second product value; and h) a divider for dividing said first difference value by said second product value and in response generating said target increment value.

3. The system of claim 1, wherein said target spacing calculator further comprises an accumulator for receiving said target increment value and generating said respective target line spacing values as a running accumulated sum of said target increment value.

4. The system of claim 3, wherein said accumulator further comprises an adder, a multiplexer and a storage register, a first input of said adder being provided for receiving said target increment value, an output of said adder being applied to a first input of said multiplexer, a second input of said multiplexer being provided for receiving a first accumulator initialization value for even ones of said pair of input video fields, a third input of said multiplexer being provided for receiving a second accumulator initialization value for odd ones of said pair of input video fields, an output of said multiplexer being connected to an input of said storage register, and an output of said storage register being connected to a second input of said adder.

* * * * *